United States Patent
Yu et al.

(10) Patent No.: US 9,634,953 B2
(45) Date of Patent: Apr. 25, 2017

(54) SCHEDULER FOR DECIDING FINAL OUTPUT QUEUE BY SELECTING ONE OF MULTIPLE CANDIDATE OUTPUT QUEUES AND RELATED METHOD

(71) Applicant: MEDIATEK INC., Hsin-Chu (TW)

(72) Inventors: Yi-Hsin Yu, Hsinchu County (TW); Yu-Hsun Chen, Hsinchu County (TW); Chang-Po Ma, Hsinchu (TW); Jui-Tse Lin, Hsinchu County (TW); Ta Hsing Liu, Sunnyvale, CA (US)

(73) Assignee: MEDIATEK INC., Hsin-Chu (TW)

( * ) Notice: Subject to any disclaimer, the term of this patent is extended or adjusted under 35 U.S.C. 154(b) by 99 days.

(21) Appl. No.: 14/252,722

(22) Filed: Apr. 14, 2014

(65) Prior Publication Data
US 2014/0321475 A1    Oct. 30, 2014

Related U.S. Application Data

(60) Provisional application No. 61/816,261, filed on Apr. 26, 2013.

(51) Int. Cl.
*H04L 12/863*    (2013.01)

(52) U.S. Cl.
CPC ........ *H04L 47/622* (2013.01); *H04L 47/6235* (2013.01)

(58) Field of Classification Search
CPC . H04L 2012/5651; H04L 49/30; H04L 47/10; H04L 49/20; H04Q 11/0478
(Continued)

(56) References Cited

U.S. PATENT DOCUMENTS 5,572,522 A * 11/1996 Calamvokis ........ H04L 12/5601
    370/390
6,687,247 B1 * 2/2004 Wilford .............. H04L 12/5693
    370/392
(Continued)

FOREIGN PATENT DOCUMENTS

CN    101478483 A    7/2009

OTHER PUBLICATIONS

"International Search Report" mailed on Jul. 29, 2014 for International application No. PCT/CN2014/076020, International filing date:Apr. 23, 2014.

*Primary Examiner* — Maharishi Khirodhar
*Assistant Examiner* — Sanjay K Dewan
(74) *Attorney, Agent, or Firm* — Winston Hsu; Scott Margo

(57) ABSTRACT

A scheduler performs a plurality of scheduler operations each scheduling an output queue selected from a plurality of output queues associated with an egress port. The scheduler includes a candidate decision logic and a final decision logic. The candidate decision logic is arranged to decide a plurality of candidate output queues for a current scheduler operation, regardless of a resultant status of packet transmission of at least one scheduled output queue decided by at least one previous scheduler operation. The final decision logic is arranged to select one of the candidate output queues as a scheduled output queue decided by the current scheduler operation after obtaining the resultant status of packet transmission of the at least one scheduled output queue decided by the at least one previous scheduler operation.

12 Claims, 3 Drawing Sheets

(58) Field of Classification Search
USPC .......................................................... 370/418
See application file for complete search history.

(56) References Cited

U.S. PATENT DOCUMENTS

| | | | | |
|---|---|---|---|---|
| 7,373,420 B1* | 5/2008 | Lyon | ................... | H04L 12/5693 370/229 |
| 7,391,786 B1* | 6/2008 | Prasad | ................... | H04L 49/101 370/412 |
| 7,733,873 B2* | 6/2010 | Bullis | ................... | G06Q 10/109 370/235 |
| 8,341,374 B2* | 12/2012 | Kwon | ................... | G06F 3/0611 711/103 |
| 8,391,302 B1* | 3/2013 | Kommidi | ................ | H04L 47/10 370/229 |
| 8,654,772 B2* | 2/2014 | Hadi Salim | ....... | H04L 29/12009 370/395.32 |
| 8,730,982 B2* | 5/2014 | Wu | ..................... | H04L 12/5693 370/412 |
| 2003/0179754 A1* | 9/2003 | Shankar | ................. | H04L 47/10 370/395.4 |
| 2004/0246970 A1 | 12/2004 | De Meulenaere | | |
| 2005/0141424 A1* | 6/2005 | Lim | ..................... | H04L 12/5693 370/235 |
| 2006/0165112 A1* | 7/2006 | Varma | ................... | H04L 45/22 370/428 |
| 2006/0187949 A1* | 8/2006 | Seshan | ................ | H04L 12/5693 370/412 |
| 2007/0008985 A1* | 1/2007 | Lakshmanamurthy | | H04L 49/1523 370/412 |
| 2007/0171929 A1* | 7/2007 | Kim | ...................... | H04L 47/527 370/412 |

\* cited by examiner

SCHEDULER FOR DECIDING FINAL OUTPUT QUEUE BY SELECTING ONE OF MULTIPLE CANDIDATE OUTPUT QUEUES AND RELATED METHOD

CROSS REFERENCE TO RELATED APPLICATION

This application claims the benefit of U.S. provisional application No. 61/816,261, filed on Apr. 26, 2013 and incorporated herein by reference.

BACKGROUND

The disclosed embodiments of the present invention relate to forwarding packets, and more particularly, to a scheduler and related method for deciding a final output queue by selecting one of multiple candidate output queues.

A network switch is a computer networking device that links different electronic devices. For example, the network switch receives an incoming packet generated from a source electronic device connected to it, and transmits an outgoing packet derived from the received packet to one or more destination electronic devices for which the received packet is meant to be received. In general, the network switch has a packet buffer for buffering packet data of packets received from ingress ports, and forwards the packets stored in the packet buffer through egress ports.

Concerning ingress packets to be forwarded through the same egress port, the ingress packets come from source electronic device connected to different ingress ports. Hence, the network switch may create a plurality of output queues for ingress packets received by different ingress ports, respectively. For example, each of the output queues corresponding to the same egress port may be simply built by storing packet identifiers (packet IDs) of packets to thereby record a packet linked list indicative of an output sequence of the packets actually stored in the packet buffer. Since there are multiple output queues, a scheduler is therefore needed to perform a plurality of scheduler operations each used for making one output queue decision that indicates which output queue is granted to output one packet to the egress port.

In general, the processing time required by a single scheduler operation should be shorter than a minimum packet transmission time (e.g., a transmission time of a 64-byte packet) to achieve the desired line rate. When the line rate becomes higher, the minimum packet transmission time is shorter accordingly. For example, when the network switch is used in a 10 Gigabit Ethernet (10 GbE) environment, the minimum packet transmission time may be 67.2 ns (nanosecond); when the network switch is used in a 40 Gigabit Ethernet (40 GbE) environment, the minimum packet transmission time may be 16.8 ns; and when the network switch is used in a 100 Gigabit Ethernet (100 GbE) environment, the minimum packet transmission time may be 6.72 ns. Hence, regarding a high-speed network application, how to design a network switch meeting the strict scheduler timing constraint is a challenge to designers in the pertinent field.

SUMMARY

In accordance with exemplary embodiments of the present invention, a scheduler for deciding a final output queue by selecting one of multiple candidate output queues and a related method are proposed to solve the above-mentioned problem.

According to a first aspect of the present invention, an exemplary scheduler for performing a plurality of scheduler operations each scheduling an output queue selected from a plurality of output queues associated with an egress port is disclosed. The exemplary scheduler includes a candidate decision logic and a final decision logic. The candidate decision logic is arranged to decide a plurality of candidate output queues for a current scheduler operation, regardless of a resultant status of packet transmission of at least one scheduled output queue decided by at least one previous scheduler operation. The final decision logic is arranged to select one of the candidate output queues as a scheduled output queue decided by the current scheduler operation after obtaining the resultant status of packet transmission of the at least one scheduled output queue decided by the at least one previous scheduler operation.

According to a second aspect of the present invention, an exemplary method for performing a plurality of scheduler operations each scheduling an output queue selected from a plurality of output queues associated with an egress port is disclosed. The exemplary method includes: deciding a plurality of candidate output queues for a current scheduler operation, regardless of a resultant status of packet transmission of at least one scheduled output queue decided by at least one previous scheduler operation; and after obtaining the resultant status of packet transmission of the at least one scheduled output queue decided by the at least one previous scheduler operation, selecting one of the candidate output queues as a scheduled output queue decided by the current scheduler operation.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

The concept of the present invention is to release the response time constraint of an acknowledgment message indicative of a resultant status of a packet transmission of a scheduled output queue by making multiple candidate output queue decisions before the acknowledgment message is ready. In this way, the packet bubble (i.e., idle egress port) probability in most cases can be reduced to thereby sustain the desired line rate. Generally speaking, the packet bubble can be completely avoided when the ingress packets are enough (i.e. the packets input to the ingress ports≥the packets output from the egress pots). Further details of the proposed scheduling design are described hereinafter with reference to the accompanying drawings.

Figure 1:
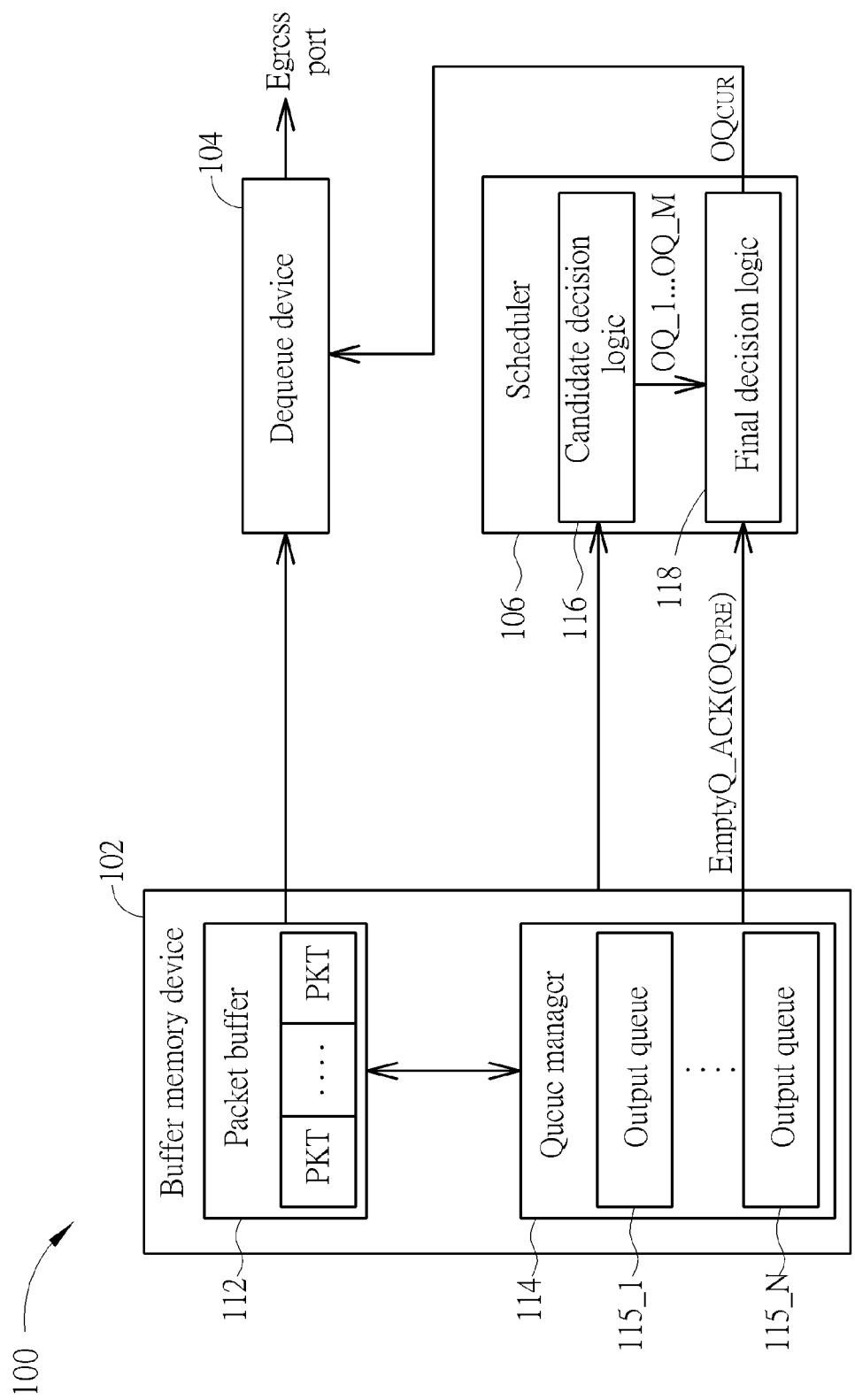
FIG. 1 is a diagram illustrating a network switch according to an embodiment of the present invention.

FIG. 1 is a diagram illustrating a network switch according to an embodiment of the present invention. The network switch 100 includes a buffer memory device 102, a dequeue device 104 and a scheduler 106. The buffer memory device 102 includes a packet buffer 112 and a queue manager 114. By way of example, the packet buffer 112 may be implemented using a dynamic random access memory (DRAM), and the queue manager 114 may include static random access memories (SRAMs) to store a plurality of packet linked lists acting as a plurality of output queues 115_1-115_N, respectively. When a packet is received from one of a plurality of ingress ports of the network switch 100, the packet is buffered in the packet buffer 112, and enqueued to one of the output queues 115_1-115_N. For example, packets received from an ingress port I (not shown) and required to be forwarded through an egress port J (not shown) are enqueued to the same output queue $OQ_{I,J}$. For clarity and simplicity, only one egress port is shown in FIG. 1. Hence, a packet received from one of the ingress ports (e.g., port 1-port N) and decided to be forwarded through the egress port is processed by a packet processor (not shown) with using lots of lookup tables according to its packet attribute. Thus, the packet is enqueued to one of the output queues 115_1-115_N maintained by the queue manager 114. The scheduler 106 is arranged to properly schedule the output queues 115_1-115_N through respective priority configurations, such as rate limitations of packets waiting to be forwarded through the same egress port. However, this is for illustrative purposes only, and is not meant to be a limitation of the present invention.

To relax the memory requirement of the output queues 115_1-115_N, a linked list structure is employed to serve as one output queue. For example, each of the output queues 115_1-115_N is a packet linked list composed of packet identifiers (packet IDs) of packets received from the same ingress port and required to be forwarded through the egress port. Hence, when a specific packet is dequeued from one output queue, a node which stores a packet ID of the specific packet is removed from the packet linked list, and the specific packet is read from the packet buffer 112 and output to the following stage (e.g., dequeue device 104) for packet forwarding through the egress port.

As the packet to be forwarded through the egress port may come from any of the ingress ports, the scheduler 106 is arranged to perform a plurality of scheduler operations one by one, where each scheduler operation makes one output queue decision for deciding which of the output queues 115_1-115_N is granted to output its packet data. That is, the scheduler 106 is arranged to properly schedule the output queues 115_1-115_N that have packets waiting to be forwarded through the same egress port.

In a conventional design, after a scheduler makes one output queue decision for granting one output queue, the scheduler does not make the next output queue decision until an acknowledgment message indicative of a resultant status of a packet transmission of the scheduled output queue is received. Thus, one scheduler operation performed by the conventional scheduler includes at least an operation of waiting for an acknowledgment message corresponding to a packet transmission of a current winner output queue and an operation of picking a next winner output queue from a plurality of output queues. In other words, the processing time required by one scheduler operation performed by the conventional scheduler includes at least a wait time and a decision-making time.

For example, an acknowledgement message EmptyQ_ACK may indicate whether the scheduled output queue will become an empty queue after dequeued by the current packet transmission. If the acknowledgement message EmptyQ_ACK indicates an empty queue, this scheduled output queue should not be selected as the next scheduled output queue; otherwise, the packet bubble (idle egress port) will occur due to no packet transmission. Besides, the generation of the acknowledgement message EmptyQ_ACK may need to search information recorded in a look-up table, and therefore may need several clock cycles. If the packet transmission of one packet dequeued from an output queue selected by one output queue decision is already complete and the conventional scheduler fails to make another output queue decision in time, the line rate of the egress port may decrease due to no packet transmission.

To release the response time constraint of an acknowledgment message indicative of a resultant status of a packet transmission of a scheduled output queue, the scheduler 106 of the present invention is configured to make multiple candidate output queue decisions, and then make a final output queue decision based on the multiple candidate output queue decisions. In this embodiment, the scheduler 106 includes a candidate decision logic 116 and a final decision logic 118. The candidate decision logic 116 is aware of queue statuses of the output queues 115_1-115_N. For example, the queue status of one output queue may indicate whether the output queue has packets to be serviced or not. The candidate decision logic 116 is arranged to decide a plurality of candidate output queues OQ_1-OQ_M for a current scheduler operation, regardless of a resultant status of packet transmission of at least one scheduled output queue $OQ_{PRE}$ decided by at least one previous scheduler operation. For example, the candidate decision logic 116 decides M candidate output queues OQ_1-OQ_M before acknowledgement messages EmptyQ_ACK for (M−1) scheduled output queues $OQ_{PRE}$ decided by (M−1) previous scheduler operations are available to the scheduler 106, where M is a positive integer not smaller than 2.

In this embodiment, the candidate output queues OQ_1-OQ_M include a specific output queue that is different from the at least one scheduled output queue $OQ_{PRE}$ decided by the at least one previous scheduler operation. Under a condition where the acknowledgement messages EmptyQ_ACK for (M−1) scheduled output queues $OQ_{PRE}$ decided by (M−1) previous scheduler operations are not ready yet, the candidate decision logic 116 first decides the best winner output queue (which has the highest decision priority) selected from the output queues 115_1-115_N associated with the egress port. When the best winner output queue is different from the (M−1) scheduled output queues $OQ_{PRE}$ decided by the (M−1) previous scheduler operations, the candidate decision logic 116 sets the best winner output queue as the specific output queue. However, when the best winner output queue is identical to the (M−1) scheduled output queues $OQ_{PRE}$ decided by the (M−1) previous scheduler operations, the candidate decision logic 116 further decides the second best winner output queue (which has the next decision priority) selected from the output queues 115_1-115_N associated with the egress port. When the second best winner output queue is different from the (M−1) scheduled output queues $OQ_{PRE}$ decided by the (M−1) previous scheduler operations, the candidate decision logic 116 sets the second best winner output queue as the specific output queue. To put it simply, the candidate decision logic 116 will try to make output queue decisions according to decision priorities until the specific output queue different from the (M−1) scheduled output queues $OQ_{PRE}$ decided by the (M−1) previous scheduler operations is found.

Since the candidate output queues OQ_1-OQ_M are determined before the acknowledgement messages EmptyQ_ACK for (M−1) scheduled output queues $OQ_{PRE}$ decided by (M−1) previous scheduler operations are ready, the candidate output queues OQ_1-OQ_M should include the (M−1) scheduled output queues $OQ_{PRE}$ decided by the (M−1) previous scheduler operations due to the fact that one of the (M−1) scheduled output queues $OQ_{PRE}$ should be allowed to be selected as the scheduled output queue $OQ_{CUR}$ for the current scheduler operation. Hence, concerning the current scheduler operation, the candidate output queues OQ_1-OQ_M determined by the candidate decision logic 116 are composed of (M−1) scheduled output queues $OQ_{PRE}$ decided by the (M−1) previous scheduler operations and a different output queue (i.e., the aforementioned specific output queue) selected from the output queues 115_1-115_N associated with the egress port.

The final decision logic 118 is arranged to select one of the candidate output queues OQ_1-OQ_M to serve as the scheduled output queue $OQ_{CUR}$ decided by the current scheduler operation after obtaining the resultant status of packet transmission of the at least one scheduled output queue $OQ_{PRE}$ decided by the at least one previous scheduler operation, such as acknowledgement messages EmptyQ_ACK for (M−1) scheduled output queues $OQ_{PRE}$ decided by (M−1) previous scheduler operations. More specifically, the final decision logic 118 checks the obtained resultant status (e.g., EmptyQ_ACK) to decide which of the candidate output queues OQ_1-OQ_M should be selected as the scheduled output queue $OQ_{CUR}$ decided by the current scheduler operation. In one preferred embodiment, the value of M is equal to 2. Therefore, two candidate output queues OQ_1, OQ_2 include a single scheduled output queue $OQ_{PRE}$ decided by a single previous scheduler operation immediately preceding the current scheduler operation, and a specific output queue different from the scheduled output queue $OQ_{PRE}$. For example, OQ_1=$OQ_{PRE}$ and OQ_2≠$OQ_{PRE}$.

When the obtained resultant status indicates that the scheduled output queue $OQ_{PRE}$ is an empty queue, implying that the candidate output queue OQ_1 is not a qualified candidate for the current scheduler operation, the final decision logic 118 selects the other candidate output queue OQ_2 to serve as the scheduled output queue $OQ_{CUR}$ decided by the current scheduler operation. When the obtained resultant status indicates that the scheduled output queue $Q_{PRE}$ is not an empty queue, implying that the candidate output queue OQ_1 is a qualified candidate for the current scheduler operation, the final decision logic 118 refers to decision priorities of the candidate output queues OQ_1, OQ_2 to decide which of the candidate output queues OQ_1, OQ_2 should be selected to serve as the scheduled output queue $OQ_{CUR}$ decided by the current scheduler operation. For example, when the candidate output queue OQ_1 (i.e., previous scheduled output queue $OQ_{PRE}$) is the best winner output queue and the other output queue OQ_2 different from the previous scheduled output queue $OQ_{PRE}$ is the second best winner output queue, the final decision logic 118 refers to decision priorities to select the candidate output queue OQ_1 (OQ_1=$OQ_{PRE}$) to serve as the scheduled output queue $OQ_{CUR}$ decided by the current scheduler operation; and when the candidate output queue OQ_2 different from the previous scheduled output queue $OQ_{PRE}$ is the best winner output queue and the other candidate output queue OQ_1 (OQ_1=$OQ_{PRE}$) is the second best winner output queue, the final decision logic 118 refers to decision priorities to select the candidate output queue OQ_2 (OQ_2≠$OQ_{PRE}$) to serve as the scheduled output queue $OQ_{CUR}$ decided by the current scheduler operation Please refer to FIG. 2, which is a timing diagram illustrating a proposed solution for releasing the response time constraint according to an embodiment of the present invention. At time $T_0$, the scheduler 106 finishes one scheduler operation $SCH_0$ to output one output queue decision $D_0=OQ_0$, and starts the next scheduler operation $SCH_1$. After notified by the output queue decision $D_0$=OQ0, the dequeue device 104 performs a packet dequeue operation upon the scheduled output queue OQ0 designated by the output queue decision $D_0$=OQ0. In this embodiment, the candidate decision logic 116 decides two candidate output queues OQ0 and OQ1 before the acknowledgement message EmptyQ_ACK (OQ0) is ready. When the acknowledgement message EmptyQ_ACK (OQ0) is available at time $T_1$, the final decision logic 118 selects one of the candidate output queues OQ0 and OQ1 according to the acknowledgement message EmptyQ_ACK (OQ0). In this example, the candidate output queue OQ1 is selected to serve as the scheduled output queue decided by the scheduler operation $SCH_1$.

At time $T_2$, the scheduler 106 finishes one scheduler operation $SCH_1$ to output one output queue decision $D_1$=OQ1, and starts the next scheduler operation $SCH_2$. After notified by the output queue decision $D_1$=OQ1, the dequeue device 104 performs a packet dequeue operation upon the scheduled output queue OQ1 designated by the output queue decision $D_1$=OQ1. Besides, the candidate decision logic 116 decides two candidate output queues OQ1 and OQ2 before the acknowledgement message EmptyQ_ACK(OQ1) is ready. When the acknowledgement message EmptyQ_ACK (OQ1) is available at time $T_3$, the final decision logic 118 selects one of the candidate output queues OQ1 and OQ2 according to the acknowledgement message EmptyQ_ACK (OQ1). In this example, the candidate output queue OQ2 is selected to serve as the scheduled output queue decided by the scheduler operation $SCH_2$.

Figure 2:
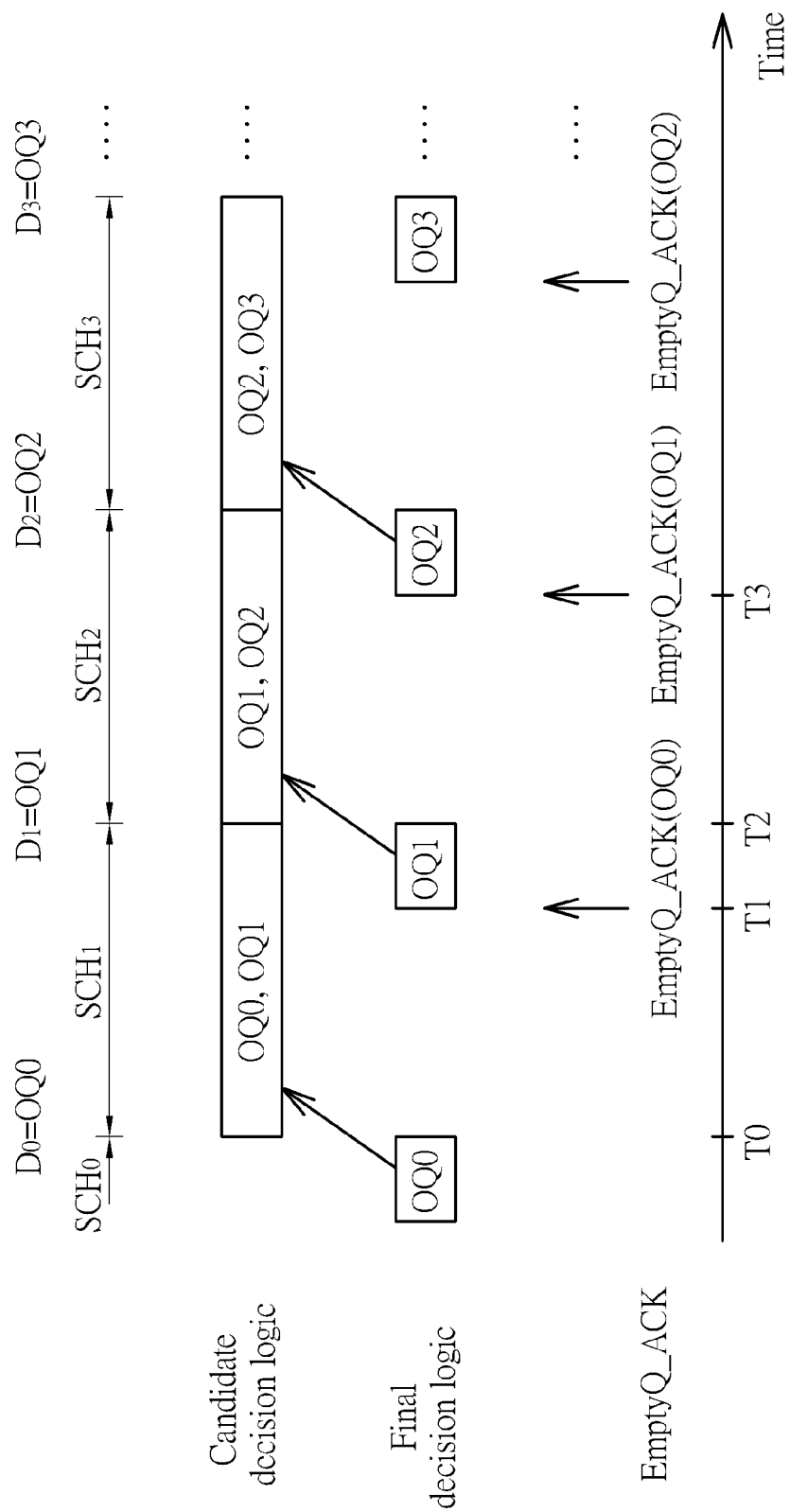
FIG. 2 is a timing diagram illustrating a proposed solution for releasing the response time constraint according to an embodiment of the present invention.

It should be noted that the output queue decisions shown in FIG. 2 are for illustrative purposes only, and are not meant to be limitations of the present invention. For example, any scheduler that makes multiple candidate output queue decisions and then makes the final output queue decision for a current scheduler operation upon reception of a resultant status of packet transmission of a scheduled output queue decided by a previous scheduler operation falls within the scope of the present invention.

In this embodiment, the processing time of making candidate output queue decisions is able to cover the response time of the acknowledgement message EmptyQ_ACK. The final output queue decision will be available at the end of the packet transmission of the current dequeued packet, such that no packet bubble (idle egress port) will happen in this case. More specifically, the candidate decision logic 116 of the scheduler 106 starts its designated operation every minimum packet transmission time to ensure the desired line rate without waiting for the acknowledgment message EmptyQ_ACK (i.e. the scheduler 106 gets related information from the buffer memory device 102 to ensure the desired line rate), and the behavior of the final decision logic 118 of the scheduler 106 is equivalent to having the final output queue right after the acknowledgement message EmptyQ_ACK is ready. Besides, a network switch employing the proposed scheduler does not need a complicated status check mechanism implemented for speeding up generation of the acknowledgement message EmptyQ_ACK. Thus, the high cost and difficulty to have a fast status check mechanism for the output queue can be avoided. Further, the architecture dependency of neighboring functional blocks in a network switch can be reduced/mitigated correspondingly.

Figure 3:
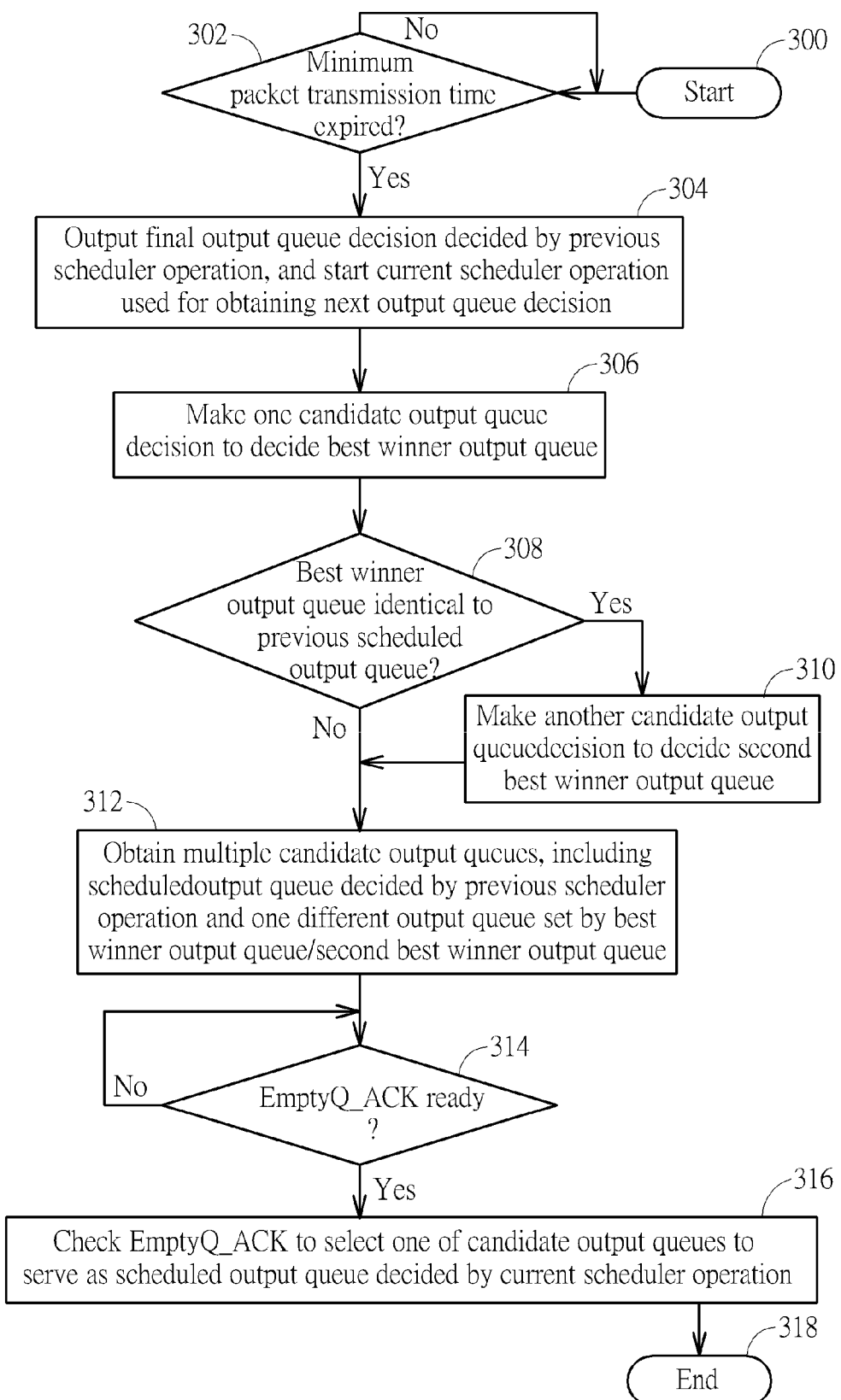
FIG. 3 is a flowchart illustrating a method for scheduling an output queue according to an embodiment of the present invention.

Please refer to FIG. 3, which is a flowchart illustrating a method for scheduling an output queue according to an embodiment of the present invention. Provided that the result is substantially the same, the steps are not required to be executed in the exact order shown in FIG. 3. The method may be employed by the scheduler 106 shown in FIG. 1, and may be briefly summarized as below.

Step 300: Start.

Step 302: Check if a minimum packet transmission time is expired. If yes, go to step 304 to start a new scheduler operation involving multiple candidate output queue decisions; otherwise, keep checking if a criterion of starting a new scheduler operation involving multiple candidate output queue decisions is met. In this embodiment, the proposed scheduler operation involving multiple candidate output queue decisions is performed every minimum packet transmission time, so as to ensure the desired line rate.

Step 304: Output an output queue decision decided by a previous scheduler operation, and start a current scheduler operation used for obtaining a next output queue decision.

Step 306: Make one candidate output queue decision to decide the best winner output queue.

Step 308: Check if the best winner output queue is identical to a scheduled output queue decided by the previous scheduler operation. If yes, go to step 310; otherwise, go to step 312.

Step 310: Make another candidate output queue decision to decide the second best winner output queue.

Step 312: Obtain multiple candidate output queues, including the scheduled output queue decided by the previous scheduler operation and a different output queue set by the best winner output queue/second best winner output queue.

Step 314: Check if a resultant status of packet transmission of the scheduled output queue decided by the previous scheduler operation is available. If yes, go to step 316; otherwise, go to step 314.

Step 316: Check the obtained resultant status to select one of the candidate output queues to serve as a scheduled output queue decided by the current scheduler operation.

Step 318: End.

As a person skilled in the art can readily understand details of each step shown in FIG. 3 after reading above paragraphs, further description is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A scheduler for performing a plurality of scheduler operations, each scheduling an output queue selected from a plurality of output queues associated with an egress port, the scheduler comprising:
a candidate decision logic, implemented by a network switch and arranged to decide a plurality of candidate output queues for a current scheduler operation, regardless of a resultant status of packet transmission of at least one scheduled output queue decided by at least one previous scheduler operation, wherein the candidate output queues are decided by the candidate decision logic before the resultant status of packet transmission is available to the scheduler; and
a final decision logic, implemented by the network switch and arranged to select one of the candidate output queues as a scheduled output queue decided by the current scheduler operation after obtaining the resultant status of packet transmission of the at least one scheduled output queue decided by the at least one previous scheduler operation;
wherein the candidate output queues comprise the at least one scheduled output queue decided by the at least one previous scheduler operation and a specific output queue; and
wherein the candidate decision logic selects a best winner output queue from the output queues associated with the egress port, and checks whether the best winner output queue is different from or identical to the at least one scheduled output queue decided by the at least one previous scheduler operation, where the specific output queue of the candidate output queues is set by the best winner output queue when the best winner output queue is different from the at least one scheduled output queue, and is not set by the best winner output queue when the best winner output queue is identical to the at least one scheduled output queue.

2. The scheduler of claim 1, wherein when the best winner output queue is identical to the at least one scheduled output queue decided by the at least one previous scheduler operation, the candidate decision logic further decides a second best winner output queue selected from the output queues associated with the egress port; and the candidate decision logic sets the second best winner output queue as the specific output queue when the second best winner output queue is different from the at least one scheduled output queue decided by the at least one previous scheduler operation.

3. The scheduler of claim 1, wherein the at least one scheduled output queue decided by the at least one previous scheduler operation only includes a single scheduled output queue decided by a single previous scheduler operation immediately preceding the current scheduler operation.

4. The scheduler of claim 1, wherein the final decision logic is further arranged to check the obtained resultant status to decide which of the candidate output queues is selected to serve as the scheduled output queue decided by the current scheduler operation.

5. The scheduler of claim 4, wherein when the obtained resultant status indicates that the at least one scheduled output queue is an empty queue, the final decision logic selects the specific output queue to serve as the scheduled output queue decided by the current scheduler operation.

6. The scheduler of claim 4, wherein when the obtained resultant status indicates that the at least one scheduled output queue is not an empty queue, the final decision logic refers to decision priorities of the candidate output queues to decide which of the candidate output queues is selected to serve as the scheduled output queue decided by the current scheduler operation.

7. A method for performing a plurality of scheduler operations each scheduling an output queue selected from a plurality of output queues associated with an egress port, comprising:

deciding a plurality of candidate output queues for a current scheduler operation, regardless of a resultant status of packet transmission of at least one scheduled output queue decided by at least one previous scheduler operation, wherein the candidate output queues are decided before the resultant status of packet transmission is available; and after obtaining the resultant status of packet transmission of the at least one scheduled output queue decided by the at least one previous scheduler operation, selecting one of the candidate output queues as a scheduled output queue decided by the current scheduler operation;

wherein the candidate output queues comprise the at least one scheduled output queue decided by the at least one previous scheduler operation and a specific output queue; and wherein the step of deciding the candidate output queues comprises:

selecting a best winner output queue from the output queues associated with the egress port; and checking whether the best winner output queue is different from or identical to the at least one scheduled output queue decided by the at least one previous scheduler operation, where the specific output queue of the candidate output queues is set by the best winner output queue when the best winner output queue is different from the at least one scheduled output queue, and is not set by the best winner output queue when the best winner output queue is identical to the at least one scheduled output queue.

8. The method of claim 7, wherein the step of deciding the candidate output queues further comprises:

when the best winner output queue is identical to the at least one scheduled output queue decided by the at least one previous scheduler operation, deciding a second best winner output queue selected from the output queues associated with the egress port; and when the second best winner output queue is different from the at least one scheduled output queue decided by the at least one previous scheduler operation, setting the second best winner output queue as the specific output queue.

9. The method of claim 7, wherein the at least one scheduled output queue decided by the at least one previous scheduler operation only includes a single scheduled output queue decided by a single previous scheduler operation immediately preceding the current scheduler operation.

10. The method of claim 7, wherein the step of selecting one of the candidate output queues as the scheduled output queue decided by the current scheduler operation comprises:

checking the obtained resultant status to decide which of the candidate output queues is selected to serve as the scheduled output queue decided by the current scheduler operation.

11. The method of claim 10, wherein the step of checking the obtained resultant status to decide which of the candidate output queues is selected to serve as the scheduled output queue decided by the current scheduler operation comprises:

when the obtained resultant status indicates that the at least one scheduled output queue is an empty queue, selecting the specific output queue to serve as the scheduled output queue decided by the current scheduler operation.

12. The method of claim 10, wherein the step of checking the obtained resultant status to decide which of the candidate output queues is selected to serve as the scheduled output queue decided by the current scheduler operation comprises:

when the obtained resultant status indicates that the at least one scheduled output queue is not an empty queue, referring to decision priorities of the candidate output queues to decide which of the candidate output queues is selected to serve as the scheduled output queue decided by the current scheduler operation.

* * * * *